United States Patent [19]
Taniuchi

[11] Patent Number: 4,723,514
[45] Date of Patent: Feb. 9, 1988

[54] EXHAUST TIMING CONTROL SYSTEM FOR TWO-CYCLE ENGINES

[75] Inventor: Kazuman Taniuchi, Saitama, Japan

[73] Assignee: Honda Giken Kogyo Kabushiki Kaisha, Tokyo, Japan

[21] Appl. No.: 906,415

[22] Filed: Sep. 11, 1986

[30] Foreign Application Priority Data

Sep. 11, 1985 [JP] Japan .................. 60-200779

[51] Int. Cl.⁴ .............................................. F02D 13/04
[52] U.S. Cl. .............................. 123/65 V; 123/90.15; 123/322
[58] Field of Search .......... 123/65 PE, 65 V, 65 P, 123/90.15, 90.16, 322

[56] References Cited

U.S. PATENT DOCUMENTS

| | | | |
|---|---|---|---|
| 4,121,552 | 10/1978 | Mithuo et al. | 123/65 PE |
| 4,202,297 | 5/1980 | Oku et al. | 123/65 PE |
| 4,333,431 | 6/1982 | Iio et al. | 123/323 |
| 4,341,188 | 7/1982 | Nerstrom | 123/324 |
| 4,364,346 | 12/1982 | Shiohara | 123/323 |
| 4,388,894 | 6/1983 | Tanaka et al. | 123/65 PE |
| 4,391,234 | 7/1983 | Holzleitner | 123/65 V |
| 4,399,788 | 8/1983 | Bostelmann | 123/323 |
| 4,494,506 | 1/1985 | Hayama et al. | 123/322 |
| 4,516,540 | 5/1985 | Nerstrom | 123/65 PE |
| 4,541,371 | 9/1985 | Kageyama et al. | 123/65 PE |
| 4,621,596 | 11/1986 | Uchinishi | 123/65 PE |
| 4,622,928 | 11/1986 | Uchinishi | 123/65 PE |
| 4,651,684 | 3/1987 | Masuda et al. | 123/90.16 |

FOREIGN PATENT DOCUMENTS

| | | |
|---|---|---|
| 3232786 | 4/1984 | Fed. Rep. of Germany . |
| 47-36047 | 9/1972 | Japan . |
| 51-21038 | 2/1976 | Japan . |
| 51-39112 | 3/1976 | Japan . |
| 51-042497 | 4/1976 | Japan . |
| 51-74623 | 6/1976 | Japan . |
| 51-147813 | 11/1976 | Japan . |
| 51-147813 | 11/1976 | Japan . |
| 52-18333 | 4/1977 | Japan . |
| 52-132916 | 10/1977 | Japan . |
| 54-158514 | 12/1979 | Japan . |
| 55-160107 | 12/1980 | Japan . |
| 56-27014 | 3/1981 | Japan . |
| 56-47609 | 4/1981 | Japan . |
| 57-62917 | 4/1982 | Japan . |
| 57-105511 | 7/1982 | Japan . |
| 58-7060 | 2/1983 | Japan . |
| 58-7059 | 2/1983 | Japan . |
| 58-36818 | 8/1983 | Japan . |
| 59-7008 | 2/1984 | Japan . |
| 59-105928 | 6/1984 | Japan . |

*Primary Examiner*—Craig R. Feinberg
*Assistant Examiner*—David A. Okonsky
*Attorney, Agent, or Firm*—Lyon & Lyon

[57] ABSTRACT

A system incorporating a pivotally mounted control valve to selectively close the upper portion of an exhaust port in a two-cycle engine including a motor coupled with the valve for driving same. A speed determination means is provided to determine the engine speed relative to a specified value. A drive means rotates the motor in either direction based on the sensing by the speed determination means. A drive current control means detects the magnitude of change of the engine speed and increases or decreases the current supplied to the motor to increase or decrease the speed of change of the control valve.

8 Claims, 12 Drawing Figures

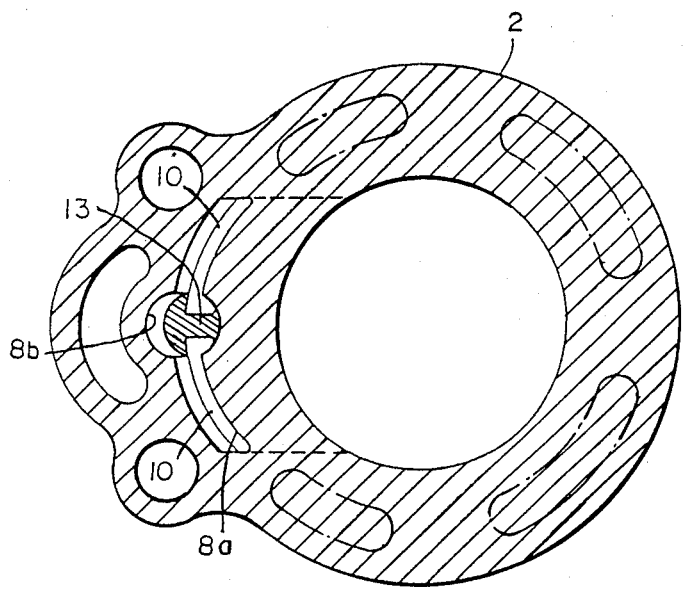
FIG. 2
FIG. 3
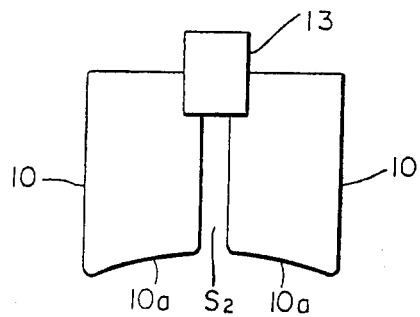
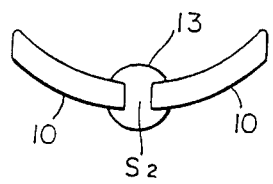
FIG. 4
FIG. 5
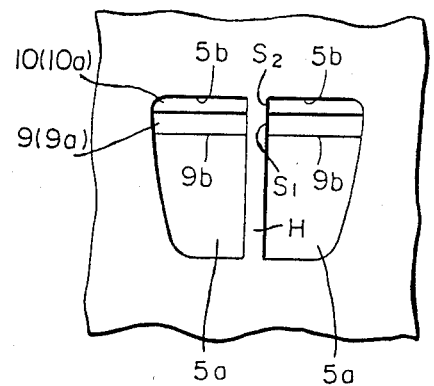

EXHAUST TIMING CONTROL SYSTEM FOR TWO-CYCLE ENGINES

BACKGROUND OF THE INVENTION

The field of the present invention is drive mechanisms for timing control valves in two-cycle engines.

Two-cycle engines typically include ports through the cylinder wall for intake, scavenging and exhaust. Such openings are repeatedly opened and closed by the piston during operation of the engine. In the case of the exhaust porting, the upper edge of the exhaust port determines the timing for both the opening and closing of the port by the piston.

Typically the power of two-cycle engines is affected by the timing of the exhaust port such that engines are tuned for power in a specific engine speed range. Such two-cycle engines may be tuned for power at low engine speeds where the use is typically for low speed driving. Tuning for power at high engine speeds may also be employed for other specific uses. However, in both instances, the range of engine speeds providing reasonable engine power are limited.

To at least partially overcome this difficulty with two-cycle engines, devices have been employed which alter the upper edge of the exhaust port. Such devices are typically incorporated in or in conjunction with the exhaust passage of the engine. Valves extend to the upper port area where they may define an upper edge of the exhaust port below the actual upper edge of the port opening. By controlling the location of such valve members, the timing may be varied in accordance with changes in engine speed.

One difficulty previously encountered with such timing devices is that they operate at fixed speeds. Consequently, they may either move too abruptly or too slowly depending on the rate of change of engine speed. As a consequence, the engine output may be adversely affected.

SUMMARY OF THE INVENTION

The present invention is directed to a system for controlling the exhaust timing of a two-cycle engine. A control valve in the exhaust port is positioned by means of an electric motor. The motor is selectively driven in either direction responsive to sensed engine speed above or below a preselected value. Further, the motor is driven at speeds responsive to the rate of change of the engine speed. To this end, a drive means is employed for selecting the motor direction while a power control means establishes the current to the motor. The greater the rate of change of the engine speed, the faster the motor operates to reposition the control valve.

Accordingly, it is an object of the present invention to provide an improved exhaust timing control system. Other and further objects and advantages will appear hereinafter.

BRIEF DESCRIPTION OF THE DRAWINGS

FIG. 2 is a cross-sectional plan view taken along line II—II of FIG. 1.

FIG. 3 is a detail front view of a control valve of the present invention.

FIG. 4 is a detail plan view of the control valve of FIG. 3.

FIG. 5 is a side view taken from line V—V of FIG. 1.

DETAILED DESCRIPTION OF THE PREFERRED EMBODIMENT

Figure 1:
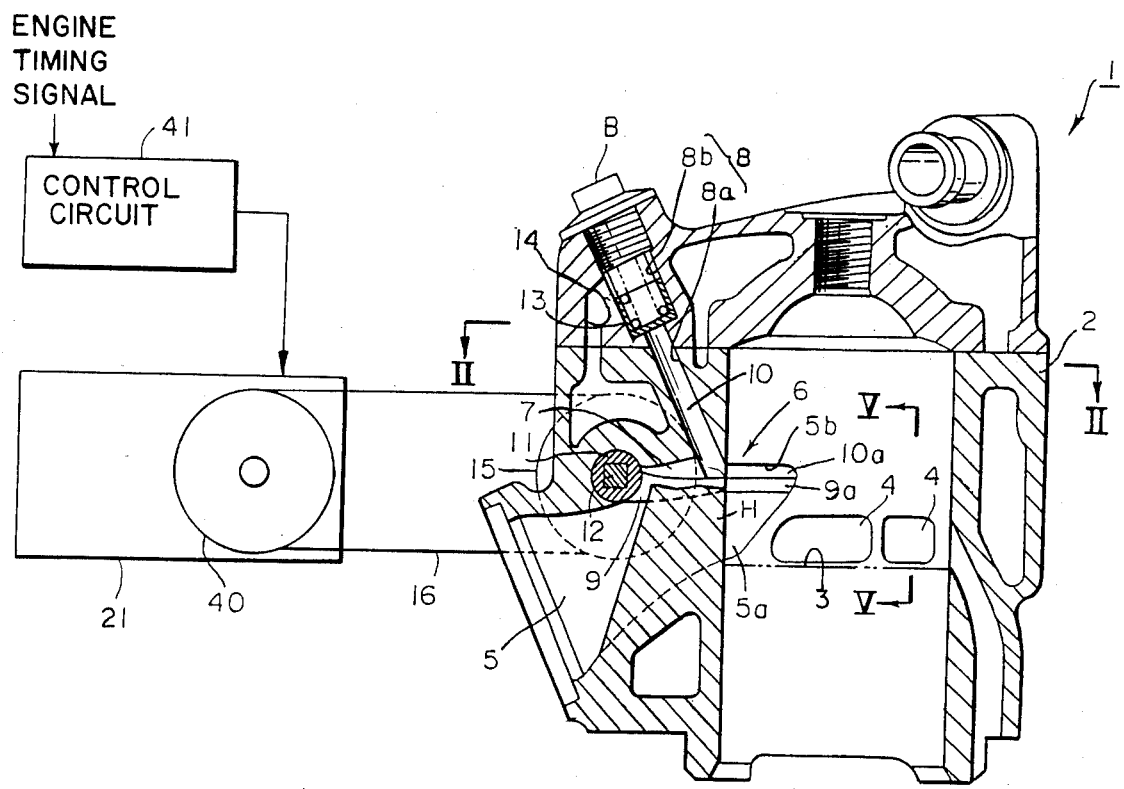
FIG. 1 is a cross-sectional side view and partial schematic of an engine employing the present invention.
Figure 6:
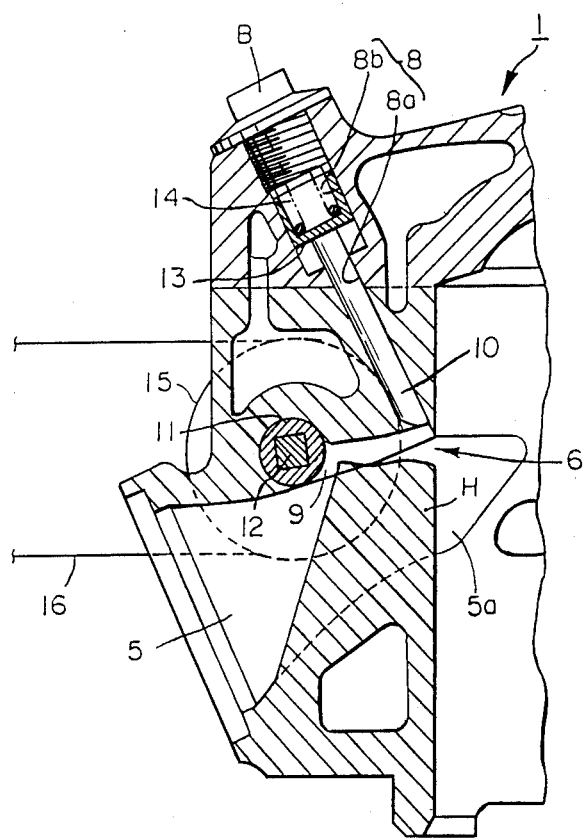
FIG. 6 is a cross-sectional side view as in FIG. 1 illustrating the control mechanism in a second position.

Turning in detail to the drawings, a two-cycle engine, generally designated 1, is shown to employ an exhaust timing control system in accordance with the present invention. The two-cycle engine 1 is provided with a cylinder 2, a piston 3 slidably arranged in said cylinder 2, a plurality of scavenging passages 4 arranged about the cylinder wall and opening into the cylinder. An exhaust passage 5 is shown to have an exhaust port 5a on the inner surface of the cylinder 2 with an exhaust timing adjustment mechanism, generally designated 6, provided in proximity to the port 5a of the exhaust passage 5.

A cavity 7 is arranged in the exhaust passage 5 formed within the cylinder 2. At a location above the exhaust passage 5 in proximity to the port 5a there is a guide hole 8. The guide hole 8 is connected with the cavity 7 inclined relative to the centerline of the cylinder.

As best illustrated in FIG. 2, the guide hole 8 is connected to the cavity 7 of the exhaust passage 5. The guide hole 8 includes a first guide portion 8a which is curved along the peripheral direction of the cylinder 2. A second guide portion 8b which is circular in cross section is connected to the first guide portion 8a. The second guide portion 8b is closed with a tap bolt B installed on the cylinder 2.

A first control valve 9 is positioned within the cavity 7. The control valve 9 includes a control face 9a which is formed in nearly the same curvature as the internal surface of the cylinder 2. A second control valve 10 is arranged within the guide hole 8. The second control valve 10 includes a control face 10a having an end portion with the curvature which is practically the same as the inner surface of the cylinder 2.

The first control valve 9 includes an integrally formed support cylinder 11 at the opposite end of the valve from the control face 9a. The support cylinder 11 is coupled with a shaft 12 which is pivotally mounted through the cylinder 2 and extends into the cavity 7 to engage the control valve 9. Through manipulation of the shaft 12, the first control valve 9 may be retracted into the cavity 7 or projected to a specific location at the port 5a. The control valve 9 is also configured to extend across the cavity 7 so as to form an upper wall of the exhaust passage 5.

As shown in FIGS. 2, 3 and 5, a second control valve 10 is formed with an arcuate portion extending to approximate the curvature of the inner surface of the cylinder 2 in the manner similar to that of the guide portion 8a of the guide hole 8. The second control valve 10 is integrally mounted on a sliding rod 13 which is in turn fitted into the second guide portion 8b. A coil spring 14 resiliently biases the second control valve 10 against the first control valve 9 along with the sliding rod 13. The coil spring is placed between the sliding rod 13 and the cylinder head, which may be by means of the tap bolt B.

The second control valve 10 normally abuts against the top of the swinging end of the first control valve 9 so as to slide in response to the swinging of the first control valve 9. As shown in FIG. 5, when the first control valve 9 moves to a location close to the top of the port 5a, the second control valve 10 extends to between the top surface of the first control valve 9 and the upper edge 5b of the port 5a. With the second control valve 10 thus extended, the control face 10a cooperates with the control face 9a to form a continuous surface with the internal wall of the cylinder 2 across the upper portion of the port 5a.

In FIGS. 1 through 6, reference letter H shows a rib for dividing the port 5a into two parts about a line parallel to the axis of the cylinder. This rib H serves as a reinforcement and is received into slits $S_1$ and $S_2$, as best seen in FIGS. 3, 4 and 5, formed in the control valves 9 and 10, respectively.

Figure 7:
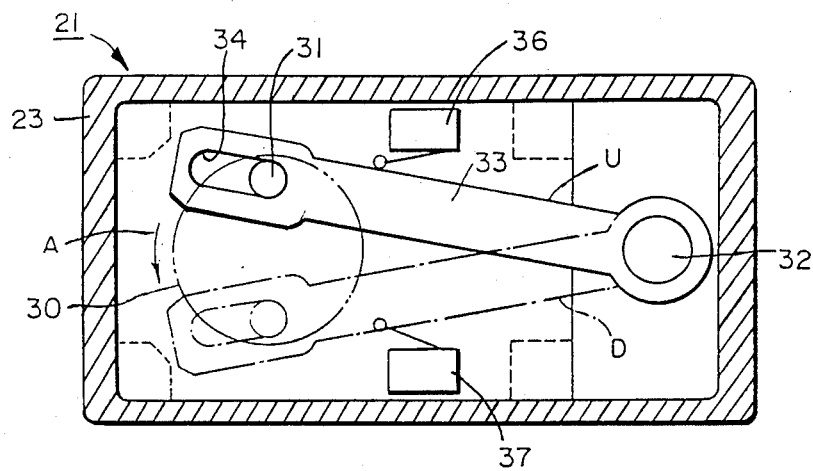
FIG. 7 is a sectional side view of an actuator of the present invention.
Figure 8:
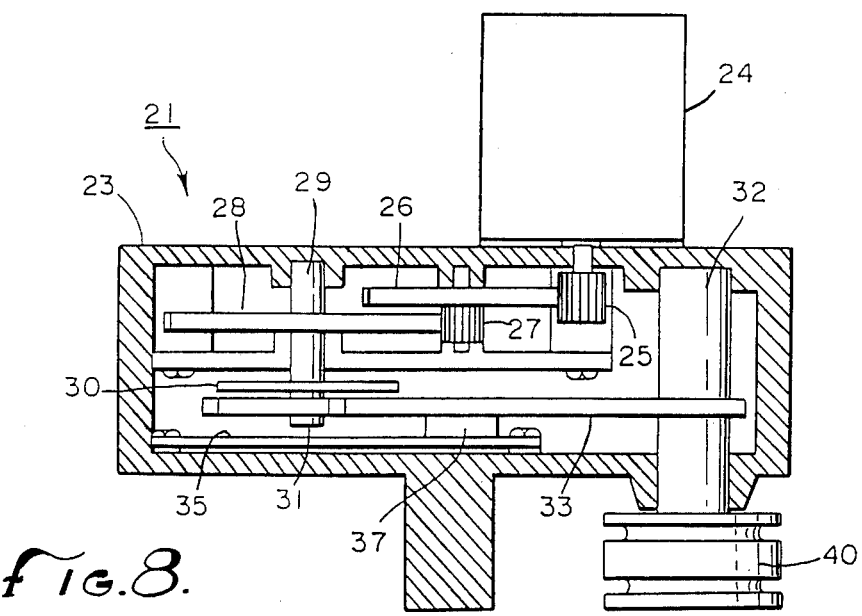
FIG. 8 is a sectional plan view of the actuator of FIG. 7.

Associated with the shaft 12 outwardly of the cylinder 2 is a pulley 15 which is coupled by means of a wire 16 to an actuator, generally designated 21. The actuator 21 includes, as best seen in FIGS. 7 and 8, a rectangular housing 23 to the outside of which is fixed a motor 24. The shaft of the motor 24 extends inside the housing 23 to receive a gear wheel 25. The gear wheel 25 is coupled with gear wheels 26, 27 and 28 to form a gear reduction mechanism. A rotatably mounted disc 30 is fastened to one end of the reduction output shaft 29 of the final gear wheel 28. An engaging pin 31 is fixed at an eccentric location on the rotatable disc 30. A drive output shaft 32 is rotatably mounted on the housing 23 parallel to the reduction output shaft 29. A swing arm 33 is fixed to the drive output shaft 32 and contains at its free end a longitudinal engaging hole 34 extending longitudinally of the swing arm 33. The engaging pin 31 is arranged to extend into the engaging hole 34 such that it may move longitudinally of the swing arm 33 and move transversely with the swing arms to rotate the drive output shaft 32.

A base plate 35 is provided on the housing 23 in parallel with the swing arm 33 to mount limit switches 36 and 37. The limit switches 36 are arranged such that they control the movement of the swing arm 33. The limit switch 36 is actuated when the swing arm 33 moves to a position as shown in full line U. The limit switch 37 is actuated when the swing arm 33 moves to the position shown by phantom line D. One end of the drive output shaft 32 projects from the housing 23 and is fastened to the pulley 40. The pulley 40 is then coupled with the pulley 15 by means of the wire 16. Consequently, the motor 24 is coupled with the control valve 9 through the reduction gear and the swing arm through an angle defined by the operation of the limit switches 36 and 37.

Figure 9:
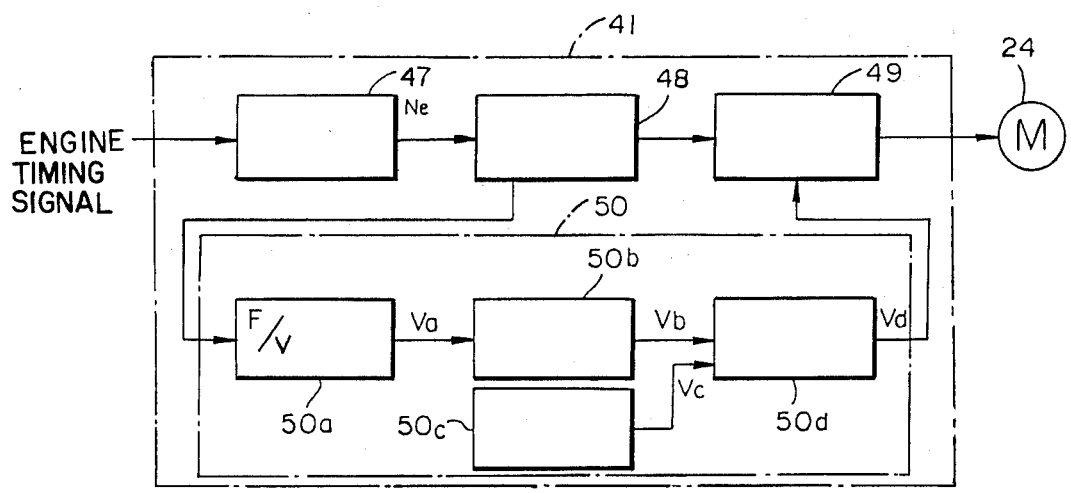
FIG. 9 is a block diagram illustrating the electrical construction of a control circuit for the present invention.
Figure 10:
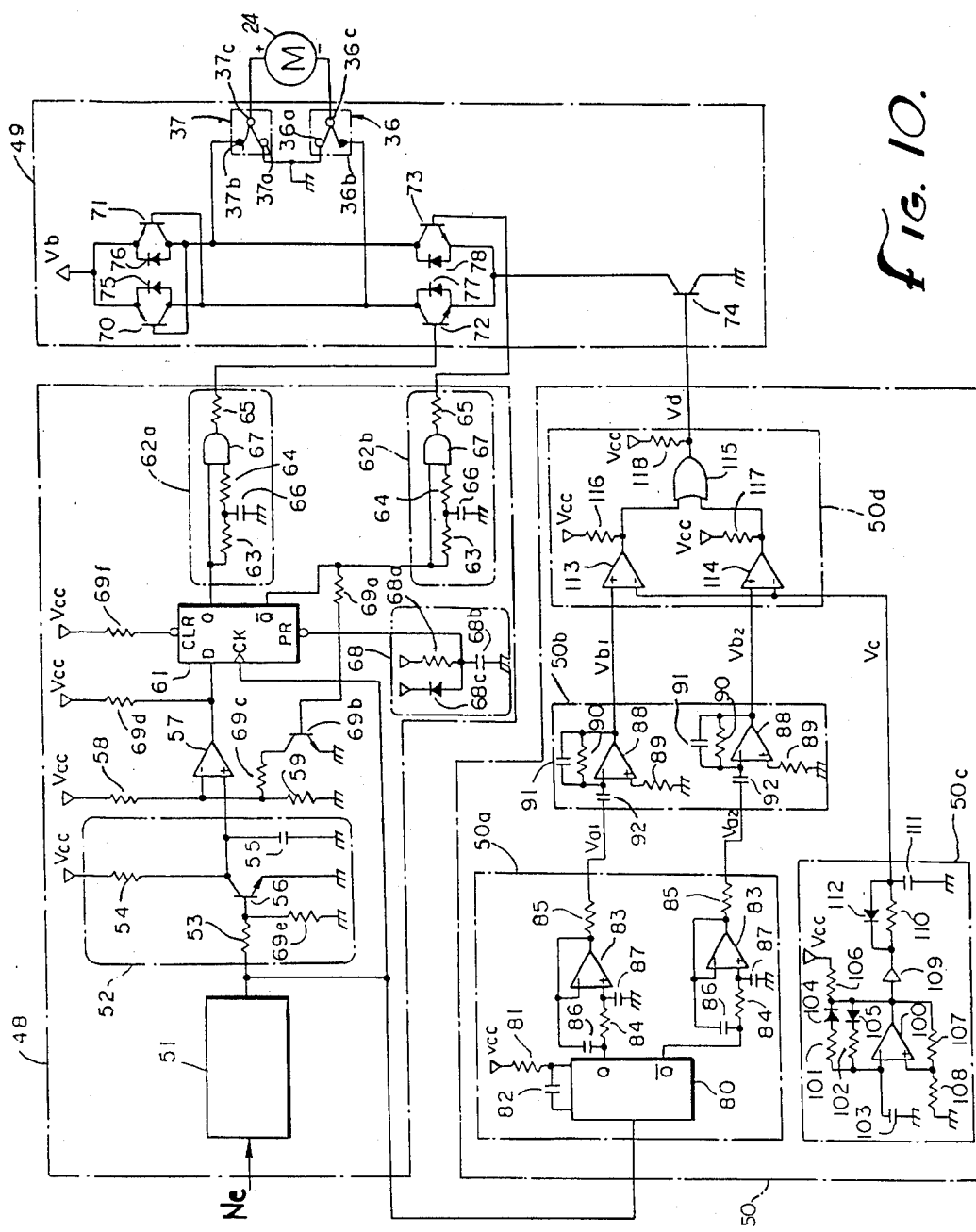
FIG. 10 is a circuit diagram showing an embodiment of a speed determination circuit, a drive circuit and a drive current control circuit of the present invention.

The rotating motion of the motor 24 which is part of the actuator 21 is controlled by a control circuit 41. The control circuit 41, as shown in FIG. 9, comprises a waveform shaping circuit 47 which shapes the waveform of pulse signals received from the primary coil of the ignition system. A pulse signal which is generated every revolution of the engine is transformed into an Ne pulse signal. A speed determination circuit 48 is then employed to determine from the Ne pulse signal whether the engine speed is higher than a preselected value. A drive circuit 49 is then employed to drive the motor 24 in either direction as determined by the speed determination circuit 48. A drive current control circuit 50 detects changes in speed from one-shot pulses corresponding to Ne pulse signals from a one-shot pulse generator 51 which is part of the speed determination circuit 48, as can be seen in FIG. 10. The drive current control circuit 50 determines the change speed drive current per unit of time which is supplied to the motor 24 from the drive circuit 49. The drive current control circuit 50 comprises an F/V (frequency/voltage) conversion circuit 50a which delivers a voltage signal $V_a$ corresponding to the engine speed based on frequency of one-shot pulses corresponding to Ne pulse signals. A differentiation circuit 50b puts out voltage signals Vb corresponding to the change in speeds of the engine from voltage signals Va output from the F/V conversion circuit 50a. A saw tooth generating circuit 50c puts out saw tooth waves Vc of specified frequency and a chopping waveform generating circuit 50d puts out chopping waveform signals based on voltage signals Vb supplied from the differentiation circuit 50b and saw tooth wave Vc supplied from the saw tooth generating circuit 50c. By chopping the waveform signals Va, a transistor 74 (as seen in FIG. 10) in the drive circuit 49 is control for ON/Off operation, whereby the quantity of current supplied per unit time to the motor 24 may be controlled. In the arrangement as described, when the engine speed is below a certain specified value, the swing arm 33 is located as shown in full line U in FIG. 7. The first control valve 9 is biased by the second control valve 10 to extend into the upper part of the port 5a of the exhaust passage 5 to a position as shown in FIG. 1. In this position, the control face 9a of the first control valve 9 and the control face 10a of the second control valve 10 extend into the port 5a.

When the engine speed rises above the specified value, the speed determination circuit 48 determines this and based on the result of this new determination the drive circuit 49 drives to rotate the motor 24. Rotation of the shaft of the motor 24 is reduced by the gears 25 through 28 for transmission to the rotatable disc 30. The disc 30 rotates in the direction of arrow A as shown in FIG. 7 such that the engaging pin 31 moves within the longitudinal engaging hole 34 of the swing arm 33. In turn the swing arm 33 moves about the drive output shaft 32 to the position shown by phantom line D in FIG. 7. At this time, the limit switch 37 is actuated by the swing arm 33 and power generation damping develops in the motor 24. The swing arm 33 moves slowly to its final location as shown by the phantom line D and stops moving when the engaging pin 31 abuts against the internal wall of the longitudinal engaging hole 34 which acts as a stop.

In the foregoing, the swing motion of the swing arm 33 is transmitted from the drive output shaft 32 to the pulley 40, the wire 16, the pulley 15 and through the shaft 12 to the first control valve 9. The consequence of this transmission is that the first valve 9 moves against the biasing force of the coil spring 14 to the location illustrated in FIG. 6. Thus, when the engine is rotating at high speeds, the first control valve 9 is stored in the cavity 7 and the upper edge of the exhaust port 5a is raised. This is considered to be a faster exhaust timing than at low speeds.

As described above, when the first and second control valves 9 and 10 are actuated, the quantity of current supplied per unit of time to the motor 24 through the drive circuit 49 is controlled by the drive current control circuit 50. In this way, the current becomes greater responsive to a greater engine speed above the specified value. Thus, when the engine speed changes suddenly, the speed of rotation of the motor and the resulting motion speed of the first and second control valves 9 and 10 increases. Conversely, when the engine speed changes slowly, the motor 24 and the resulting first and second control valves 9 and 10 move at a slower rate.

When the engine is running at low speeds, the swing arm 33 is located as shown by the full line U in FIG. 7. At high speeds, the swing arm 33 is located at the phantom line D. With the swing arm 33 at either of these positions, the external forces on the pulley 40 are resisted by the engaging pin 31 on the disc 30. The force then generated to rotate the member 30 is small with the components in this orientation such that a locking condition is effected.

Looking again to FIG. 10 and the details of the circuit composition, in the speed determination circuit 48, the one-shot pulse generator 51 generates one-shot pulses of specified time width acording to the rising edges of Ne pulses supplied from the waveform shaping circuit 47. The output end of the one-shot pulse generator 51 is connected to a charge/discharge circuit 52 and the clock input terminal CK of a D flip-flop circuit 61 that functions as a latch circuit. The charge/discharge circuit 52 comprises a resistance 53, a condenser 55 and a transistor 56. The circuit 52 is so arranged that when the transistor 56 is turned OFF, voltage Vcc is supplied through the resistance 54 to the condenser 55 to charge the condenser 55. Each time the trnasistor 56 is turned to ON in response to one-shot pulse, accumulted charge of the condenser 55 is discharged. To the output end of the charge/discharge circuit 52 or one end of the condenser 55 is connected a comparison circuit 57. The comparison circuit 57 is for comparing the terminal voltage of the condenser 55 with divided voltages of voltage Vcc by means of resistances 58 and 59. The output end of the comparison circuit 57 is connected to the input terminal D of the D flip-flop 61. The D flip-flop 61 holds the output level of the comparison circuit 57 according to one-shot pulses supplied from the one-shot pulse generating circuit 51. The holding data is conveyed to the drive circuit 49 through delay circuits 62a, 62b from a Q output terminal and a $\overline{Q}$ output terminal, respectively. Each of these delay circuits 62a, 62b comprises resistances 63, 64 and 65, a condenser 66 and an and-gate 67. By delaying the rising edge of Q output or $\overline{Q}$ output of the D flip-flop, short-circuiting is prevented between transistors 70 to 73. An initial set circuit 168 comprising a pull-up resistance 68a, a condenser 68b and a diode 68c is connected to the preset input terminal PR of the D flip-flop 61. When power source is closed, the D flip-flop 61 grows to be in set condition. In the figure, 69a, 69c, 69d, 69e, 69f are resistances and 69b is a transistor.

Figure 11:
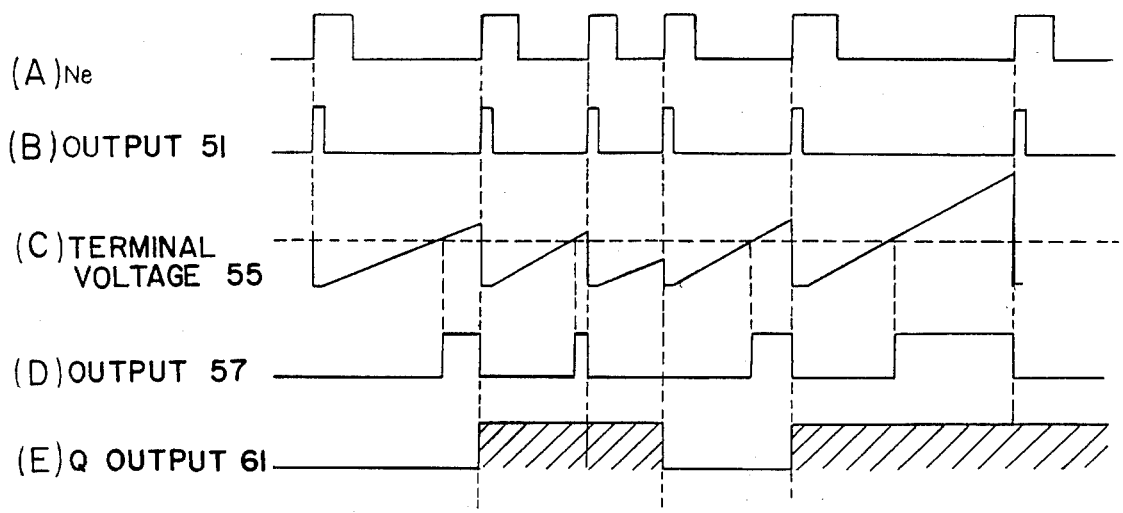
FIG. 11 is a timing chart illustrating responses of components of the speed determination circuit.

In the speed determination circuit 48 as described, Ne pulse signals that become shorter in generation intervals as the engine speed become higher are supplied as shown in FIG. 11(a) from the waveform shaping circuit 47 to the one-shot pulse generator 51. The one-shot pulse generator 51 generates one-shot pulses of specified time width as shown in FIG. 11(b) according to the rising edges of Ne pulse signals. One-shot pulses are supplied to the base of the transistor 56 through the resistance 53, so that the transistor 56 is turned to ON. With the transistor 56 being turned ON, the condenser 55 is short-circuited between the ends and accumulated charge of the condenser is discharged. As the one-shot pulse disappears, the transistor 56 is turned to OFF. With the transistor 56 being turned to OFF, the voltage Vcc is applied to the condenser 55 through the resistance 54 and the terminal voltage of the condenser 55 rises gradually as shown in FIG. 11(c) until immediately before generation of the next one-shot pulse. When the terminal voltage of the condenser 55 exceeds the divided voltages of the voltage Vcc by means of the resistances 58, 59, the output level of the comparison circuit 57 inverts as shown in FIG. 11(d) from "L" level to "H" level. The output level of the comparison circuit 57 is held by the D flip-flop 61 according to the rising timing of one-shot pulse. By this, as shown in FIG. 11(e), Q output of the D flip-flop 61 becomes "H" level if the engine speed is determined as high and becomes "L" level if the engine speed is determined as low.

The drive circuit 49 includes the limit switches 36, 37, transistors 70 to 74, and diodes 75 to 78. The Q output of the D flip-flop 61 is supplied through the delay circuit 62a to the base of the NPN transistor 72, and the $\overline{Q}$ output of the D flip-flop 61 is supplied through the delay circuit 62b to the base of the NPN transistor 73. The emitters of these transistors 72 and 73 are connected therebetween and are connected to the collector of the transistor 74 for drive current control. The emitter of the transistor 74 is grounded. The diodes 77, 78 are connected between the respective collectors and emitters of the transistors 72, 73. The collector of the transistor 72 is connected to the normally closed contact 36b of the limit switch 36, to the collector of the PNP transistor 70 and to the collector of the PNP transistor 71. The collector of the transistor 73 is connected to the normally closed contact 37b of the limit switch 37, to the collector of the transistor 71 and to the collector of the transistor 70. The diodes 75, 76 are connected between the respective collectors and emitters of the transistors 70, 71, the emitters of the transistors 70, 71 are connected together and the voltage Vb is supplied to each emitter. The normally open contacts 36a, 37a of the limit switches 36, 37 are both grounded, and the common contacts 36c and 37c are connected to the negative terminal and positive terminal of the motor 24, respectively.

In the drive circuit 49 composed as described, when the engine speed is less than the specified value, the Q output of the D flip-flop 61 of the speed determination/holding circuit 48 is at "L" level and the $\overline{Q}$ output at "H" level, the transistor 73 is turned to ON. The transistor 70 is also turned to ON as the result thereof and the other transistors 71 and 72 are turned to OFF. In this case, if the swing arm 33 is located at the position shown by full line U in FIG. 7, the limit switch 36 is switched and as shown by dotted line in FIG. 10 the common contact 36c is connected to the normally opened contact 36a. Therefore, the voltage Vb is not supplied to the positive terminal of the motor 24, the negative terminal is grounded through the common contact 36c and the normally opened contact 36b. As the result, the motor 24 is in the stopped condition.

From this condition, when the engine speed rises to such a level as to be determined as high speed by the speed determination circuit 48, with the Q output of the D flip-flop 61 growing to be "H" level and the $\bar{Q}$ output to be "L" level, the the transistor 71 is turned to ON this time, the transistor 72 is also turned to ON as the result thereof, and the other transistors 73 and 70 are turned to OFF. Then, voltage Vb is supplied to the positive terminal of the motor 24 through the common contact 37c, normally closed contact 37b and transistor 71. Then the motor 24 starts rotating normally to rotate the rotating member 30 shown in FIG. 7 in the direction of arrow A whereby the swing arm 33 moves toward the location of the phantom line D. By this, the swing arm 33 moves away from the limit switch 36, the common contact 36c of the limit switch 36 is separated from the normally opened contact 36a and is connected to the normally closed contact 36b. In this condition, the negative terminal of the motor 24 is grounded through the transistors 72 and 74, so that the motor 24 keeps rotating normally. In this case, the transistor 74 is controlled for ON/OFF by the chopping waveform signals Vd supplied from the drive current control circuit 50 and the voltage Vb is intermittently supplied to the motor 24. Because the duty ratio of the chopping waveform signals Vd supplied from the drive current control circuit 50 changes according to the change speed of the engine rpm, the quantity of current supply per unit time supplied to the motor 24 according to the change speed varies. As a result, the rotating speed of the motor 24 and the resultant speeds of operating the first and second control valves 9, 10 vary also. Later, as the swing arm 33 moves to the neighborhood of the location of the phantom line D shown in FIG. 7, the limit switch 37 is switched and the common contact 37c is connected to the normally opened contact 37a as shown by dotted line in FIG. 10. By this, supply of the voltage Vb to the motor 24 is cut off and after that the motor 24 keeps rotating by inertia. However, as the result of this rotation, electromotive force generates between the positive and negative terminals of the motor 24 and a short-circuit develops between the two terminals through the diode 77, so that braking force acts on the motor 24 to stop it.

In the condition as described above, that is, the condition where the common contact 37c of the limit switch 37 is connected to the normally opened contact 37a, with the swing arm 33 located at the phantom line D shown in FIG. 7, as the engine speed lowers to less than the specified value and the Q output of the D flip-flop 61 grows to be "L" level and the $\bar{Q}$ output to be "H" level, the transistor 73 is turned to ON and the transistor 70 is turned to ON also as the result thereof. By this, the positive terminal of the motor 24 is grounded, the voltage Vb is supplied through the transistor 70 to the negative terminal of the motor 24, and the motor 24 starts rotating reversely. The rest is the same as described above, where the rotating member 30 rotates in the direction opposite to the direction of arrow A, the swing arm 33 moves toward the location of full line U, moving away from the limit switch 37. In this case also, the quantity of current supply per unit time supplied to the motor 24 is controlled by the drive current control circuit 509 that controls the transistor 74 for ON/OFF. Thus, the rotating speed of the motor 24 and the resultant speeds of operating the first and second control valves 9 and 10 vary according to the change speed of the engine rpm. Then, as the swing arm 33 keeps moving further to the neighborhood of the location of full line U, the limit switch 36 is switched and the common contact 36c is connected to the normally opened contact 36a as shown by dotted line in FIG. 10. By this, the supply of the voltage Vb to the motor 24 is cut off, and after that the motor 24 keeps rotating by inertia, as the result of this rotation electromotive force generates between the positive and negative terminals of the motor 24 and a short-circuit develops between the two terminals through the diode 78, so that braking force acts on the motor 24 to stop it.

Figure 12:
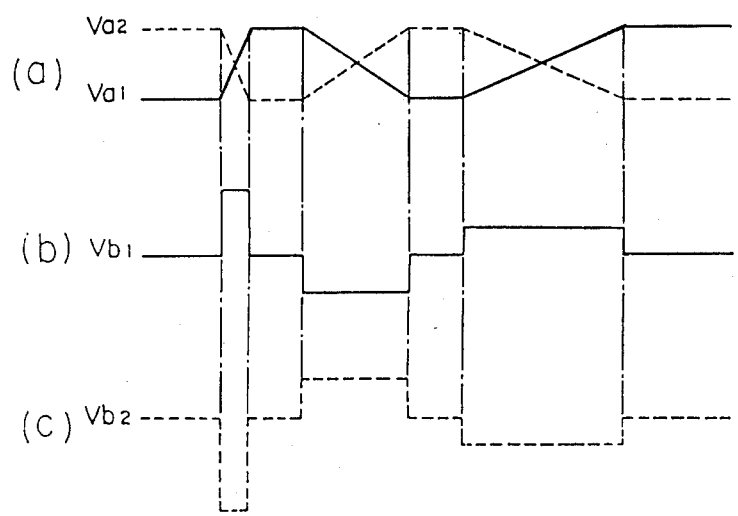
FIG. 12 is a second timing diagram illustrating various voltage responses in the present system.
Figure 12:
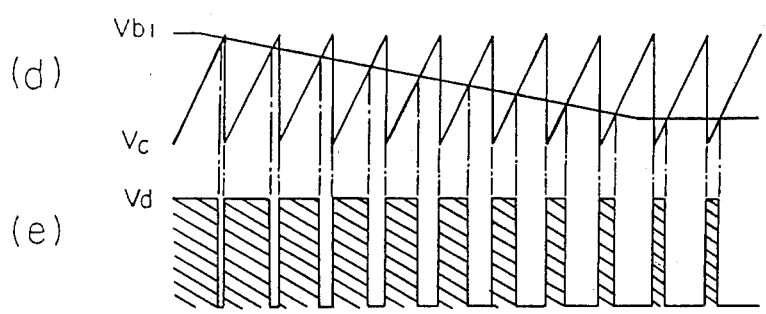

Next, in the drive current control circuit 50, the F/V conversion circuit 50a includes a one-shot multi vibrator 80 to be triggered by one-shot pulses delivered from the one-shot pulse generator 51. An external resitance 81 and a condenser 82 of the one-shot multi vibrator 80, and a circuit comprising a pair of operating amplifiers 83 that outputs voltage signals Va1 and Va2 respectively according to the engine rpm from the Q output and $\bar{Q}$ output of the one-shot multi vibrator 80, resistances 84, 85, and condensers 86, 87 are also included. The circuit 50a delivers, as shown by full line and dotted line in FIG. 12(a), for instance, voltage signals Va1 and Va2, respectively. The differentiation circuit 50b is constituted with a circuit comprising a pair of operating amplifiers 88 that differentiate voltage signals Va1 and Va2, respectively, to output voltage signals Vb1 and Vb2, resistances 89, 90 and condensers 91, 92. Voltage signals Vb1 and Vb2 as shown in FIGS. 12(b) and (c), respectively, are delivered according to voltage signals Va1 and Va2 as shown in FIG. 12(a). The saw tooth generating circuit 50c includes a square wave generating circuit comprising a comparator 100, resistances 101, 102 for duty ratio setting, a condenser 103, diodes 104, 105 and resistances 106 to 108, a buffer 109, an integration circuit comprising a resistor 110 and a condenser 111 for integrating square waves into saw tooth waves, and a diode 112, and outputs saw tooth waves Vc as shown in FIG. 12(d). The chopping waveform generating circuit 50d includes a comparator 113 for comparing saw tooth waves Vc with voltage signals Vb1 supplied from the differentiation circuit 50b, a comparator 114 for comparing saw tooth waves Vc with voltage signals Vb2, an or-gate 115 for taking the "or" of these comparator 113 output and comprator 114 output, and pull-up resistances 116 to 118, supplies output of the or-gate 115, that is, chopping waveform signals Vd shown in FIG. 12(e) to the base of the transistor 74 in the drive circuit 49 to control the transistor 74 for ON/OFF.

In the exhaust timing control system composed as described in the foregoing, the transistor 74 in the drive circuit 49 that drives the motor 24 is controlled for ON/OFF by chopping waveform signals Va supplied from the drive current control circut 50. The duty ratio of the chopping waveform signals Vd, that is, the period during which the transistor 74 is ON, becomes longer as the change speed of the engine speed increases. Therefore, in the case where the engine speed changes suddenly, the quantity of current supply per unit time supplied to the motor 24 becomes greater, and the rotating speed of the motor 24 and the resultant speeds of operating the first and second control valves 9, 10 increase. Conversely, in the case where the engine speed changes slowly, the quantity of current supply per unit time supplied to the motor 24 becomes smaller, and the rotating speed of the motor 24 and the resultant speeds of operating the first and second control valves 9, 10 decreases.

As described in the foregoing, a system is provided with a control valve to open or close the upper part of the port of an exhaust passage connected to the combustion chamber of a cylinder in a two-cycle engine for adjustment of exhaust timing. A motor for operating said control valve, a speed determination means to determine whether or not the engine speed is higher than a specified value, a drive means to rotate the motor in the normal or reverse direction based on the result of determination by the speed determination means, and a drive current control means to detect speed changes of the engine and to increase or decrease current supplied to the motor based on the result of detection are arranged so that drive current in proportion to the speed change of the engine is supplied to the motor, so that the control valve operates at speeds proportional to the speed changes, whereby it can provide the effect of smoothly changing the output of the engine in spite of varying rates of speed changes of the engine when the control valve opens or closes.

What is claimed is:

1. An exhaust timing control system for a two-cycle engine having an exhaust port and a control valve in the exhaust port, comprising
   a motor coupled with the control valve to position the control valve;
   sensor means for sensing the speed of the engine;
   drive means coupled with said motor for driving said motor selectively in either direction responsive to said sensing means; and
   power control means responsive to said sensor means for selectively increasing power to said motor as the rate of change of the speed of said engine increases and decreasing power to said motor as the rate of change of the speed of said engine decreases.

2. An exhaust timing control system for a two-cycle engine having an exhaust port and a control valve in the upper edge of the exhaust port, comprising:
   a motor coupled with the control valve to position the control valve to either a first, full-flow position or a second, closed position;
   sensor means for sensing the speed of the engine;
   drive means coupled with said motor for driving said motor selectively in either direction responsive to said sensor means; and
   drive current control means to control the duty ratio of the current supplied to the motor in accordance with the rate of change of speed of the engine.

3. An exhaust timing control system for a two-cycle engine having an exhaust port, comprising:
   first and second control valves working in unison to selectively adjust the position of the top of the exhaust port;
   a motor operatively conencted to one of said control valves to position said control valves; and
   motor control means responsive to the speed of said engine for selectively adjusting the speed at which said motor operates, according to rate of change of speed of said engine.

4. The exhaust timing control system of claim 3, in which said motor control means further comprises:
   speed determination means for determining the speed of said engine and outputting a signal that indicates whether the speed of said engine is below a preselected value;
   motor speed selection means responsive to the speed of said engine for outputting a signal that indicates the rate of change of speed of said engine; and
   motor drive means operatively connected to both said speed determination means and to said motor speed selection means for adjusting the position and turning direction of said motor according to the speed of said engine, and for adjusting the speed at which said motor turns according to the rate of change of speed of said engine.

5. The exhaust timing control system of claim 4, in which said speed determination means outputs a second signal which is the compliment of said signal.

6. The exhaust timing control system of claim 4, in which said second control valve is spring-biased to contact said first control valve.

7. An exhaust timing control system for a two-cycle engine having an exhaust port, comprising:
   a first control valve in said exhaust port;
   a second control valve in said exhaust port spring-biased to contact said first control valve;
   a motor operatively connected to said first control valve to selectively position said first and second control valves in unison;
   a drive circuit operatively connected to said motor for selecting the position of said motor as a function of the speed of said engine, and for selectively adjusting the speed at which said motor turns as a function of the rate of change of speed of said engine.

8. The exhaust timing control system of claim 7, further comprising:
   speed determination means operatively connected to said drive circuit for inputting a plurality of signals to said drive circuit, which signals indicate whether the speed of said engine is below a predetermined value; and
   a drive control circuit for inputting to said drive circuit a signal indicating the rate of change of speed of said engine.

* * * * *